United States Patent [19]
Gartz

[11] Patent Number: 5,392,954
[45] Date of Patent: Feb. 28, 1995

[54] RIVET SETTING MACHINE

[75] Inventor: Kaj Gartz, Orange, Conn.

[73] Assignee: Gartz & White Inc., Milford, Conn.

[21] Appl. No.: 158,638

[22] Filed: Nov. 29, 1993

[51] Int. Cl.[6] ............................................. B65H 9/00
[52] U.S. Cl. .................... 221/165; 221/211;
221/213; 221/278; 221/225; 221/161; 221/162;
221/168; 221/172; 221/262
[58] Field of Search ............... 221/165, 211, 213, 278,
221/224, 225, 156, 157, 159, 160, 161, 162, 168,
172, 262, 273

[56] References Cited

U.S. PATENT DOCUMENTS

| | | | |
|---|---|---|---|
| 2,918,198 | 12/1959 | Kjellsen et al. | 221/211 |
| 3,297,131 | 1/1967 | Pawlowski | 221/160 X |
| 3,448,236 | 6/1969 | Spisak | 221/278 X |
| 3,494,014 | 2/1970 | Lundgren | 221/172 X |
| 4,363,573 | 12/1982 | Ginther et al. | 221/278 X |
| 4,732,296 | 3/1988 | Heck et al. | 221/172 |

*Primary Examiner*—Robert P. Olszewski
*Assistant Examiner*—Dean A. Reichard

[57] ABSTRACT

A device for delivery of fasteners having heads with tenons disposed beneath the heads to an insertion tool. The device includes a sloped track with two spaced-apart rails each having a fastener receiving surface to receive the undersides of the heads of the fasteners falling thereon. The fasteners drop onto the track from a rotating barrel and some are correctly aligned with the tenons between the rails and the undersides of the heads resting on the rails and many are misaligned. The fasteners slide to an orienting station which includes a plurality of fluid injector ports disposed around the track. Two of the ports face each other and a third port is disposed over the track. Blasts of air are directed through the ports sequentially so that misaligned fasteners on the track are forced into alignment or are removed from the track thereby leaving only properly aligned fasteners to proceed. A segregation station is disposed downstream of the orientation station to receive a supply of fasteners arriving in a continuous aligned row from the orientation station. The segregation station delivers a single fastener to a receiver for engagement by the insertion tool. The receiver receives the fastener and holds it in an operative relationship relative to the insertion tool. An air jet in the segregation station and a vacuum source in the receiver moves the fastener from the segregation station to the receiver.

18 Claims, 5 Drawing Sheets

RIVET SETTING MACHINE

BACKGROUND OF THE INVENTION

The present invention relates to a feeding and driving apparatus which is designed to feed fasteners serially from a supply into a position where one of the fasteners from the supply can be inserted into workpieces to attach them together. Apparatus of this type typically includes a hopper and a mechanism to position the fasteners correctly in a line for presentation to a pocket which captures them and presents them before an insertion tool. In particular, the present invention relates to a riveting machine which is efficient in operation and reduces jamming in the feed mechanism. The feed mechanism of the present invention is structurally simple and uses relatively few moving parts to orient the fasteners in a row and then present them one at a time to an insertion tool. Importantly, the feed mechanism can be easily removed from the support and drive and replaced with another, thus making it easy to change from one rivet size to another as contrasted with existing machines that use large and bulky parts which have to be unbolted from a frame. Change over for setting different sized rivets in the prior art machines is quite time consuming.

SUMMARY OF THE INVENTION

The present invention particularly relates to a machine for delivering rivets having heads and centrally disposed tenons to an insertion tool from a bulk supply. The machine includes a sloped track with two rails spaced apart slightly more than the width of the tenon of the rivet being fed. The rivets are randomly dropped on the track and some of the tenons fall in correct alignment between the rails with the undersides of the heads resting on the rails for subsequent feeding. Other rivets fall misaligned with the top sides or edges of the heads riding on the rails and the tenons not between the rails. The rivets, whether aligned or misaligned, proceed down the track until they reach an orientation station. The track runs through an opening in the orientation station and only properly aligned rivets can pass through the opening. A plurality of fluid injector ports are disposed around the track in the orientation station. Two of the ports face each other on a plane that is parallel but above the track. A third port is disposed over the track.

Blasts of air are directed sequentially through the ports toward the rivets. For example, a blast of air will blow over the track from the left side of the opening toward the right side. If a rivet is correctly aligned the blast of air will pass over it. On the other hand if the edge of the head of the rivet is riding in the track the blast of air will catch the opposite side of the head and blow the rivet off. Another blast of air in the sequence will blow from the right side to the left and will encounter rivets which are oppositely misaligned. Rivets which are upside down will encounter a stop wall that is provided with a predetermined space between the track and the top of the opening. A third fluid port in the orientation station is directed downwardly toward the track and will blow rivets off which are upside down and also will separate two rivets which have overlapping heads. The preferred sequence for the air blasts is from one side, then the top and then from the other side, the cycle being continuously repeated so long as the machine is operating.

Rivets which are correctly oriented will proceed through the orientation station and will exit to a segregation station. The segregation station also includes a pair of spaced apart rails which receive aligned rivets in a row. The fasteners arrive in the station in a continuous aligned row and the segregation station delivers a single fastener to an insertion tool. The segregation station includes an entry track, a stop wall and a shuttle track. The stop wall allows only the first in line of the rivets to enter a slot in a shuttle while it is in a first position. The rivet is moved in the shuttle track to a second position at an exit station. A blast of air in the exit station together with the application of a vacuum in a fastener receiver moves the fastener from the exit station into the receiver. The receiver preferably is fork shaped and aligns the fastener directly beneath the insertion tool. The vacuum holds the fastener in the receiver.

The tip of the insert tool is then moved to engage the head of the rivet to fasten parts together. As the insertion tool moves downwardly and engages the head of the rivet and the rivet no longer needs the support of the receiver, the receiver is withdrawn from beneath the head of the rivet and the orientation and segregation cycles of the machine of the present invention are completed. The rivet is then placed on the pin and attached to the workpiece in a conventional manner.

DESCRIPTION OF THE PREFERRED EMBODIMENT

Figure 1:
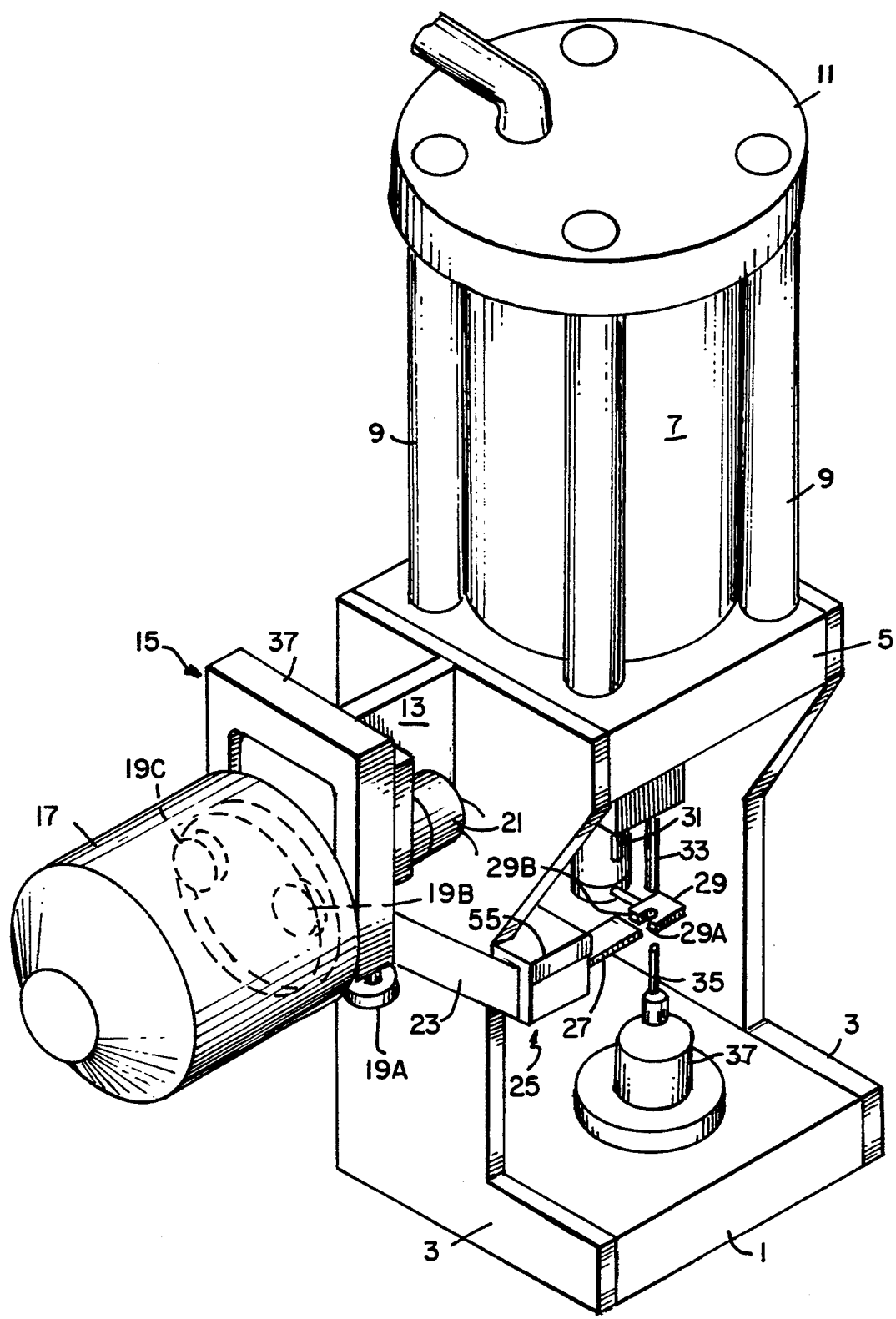
FIG. 1 is a perspective view of a front of the fastener insertion machine according to the present invention.

The rivet inserting machine of the present invention is shown in FIG. 1. The machine includes a base 1 having a pair of frame plates 3 mounted on either side thereof. The frame plates 3 also support an upper base 5. An air press 7 is disposed upon the upper base 5 and is secured in position by tie rods 9. Tie rods 9 extend between the upper base 5 and an air press plate 11. A setoff 13 is mounted on frame plate 3 and supports orientation station 15. A barrel 17 is held on an orientation station 15 by means of bearings 19A and 19B together with drive wheel 19C which rotates the barrel 17 to tumble a supply of rivets that is in it. Drive wheel 19C is powered by motor 21.

Some of the rivets tumbling in barrel 17 fall onto a track inside the barrel 17 and pass through orientation station 15 and down track 23 to reach segregation station 25. Segregation station 25 is attached to frame plate 3 and an aligned row of rivets moves downwardly on track 23 by gravity.

The rivets emerge one at a time from an exit chute 27. A rivet is caught by a receiver fork 29 between tines 29A and 29B. Receiver fork 29 is mounted on a cammed post 31. A punch 33, serving as the insertion tool, operated by air press 7 moves downwardly to encounter a rivet held by receiver fork 29. The rivet is held in place under the punch 33 by receiver 29 until its tenon engages pin 35 as punch 33 moves downwardly. When the tenon encounters the pin 35 and the head is engaged by punch 33, receiver fork 29 swings up and out of the way by means of cammed post 31 to avoid contact of the fork 29 and the punch 33.

Figure 2:
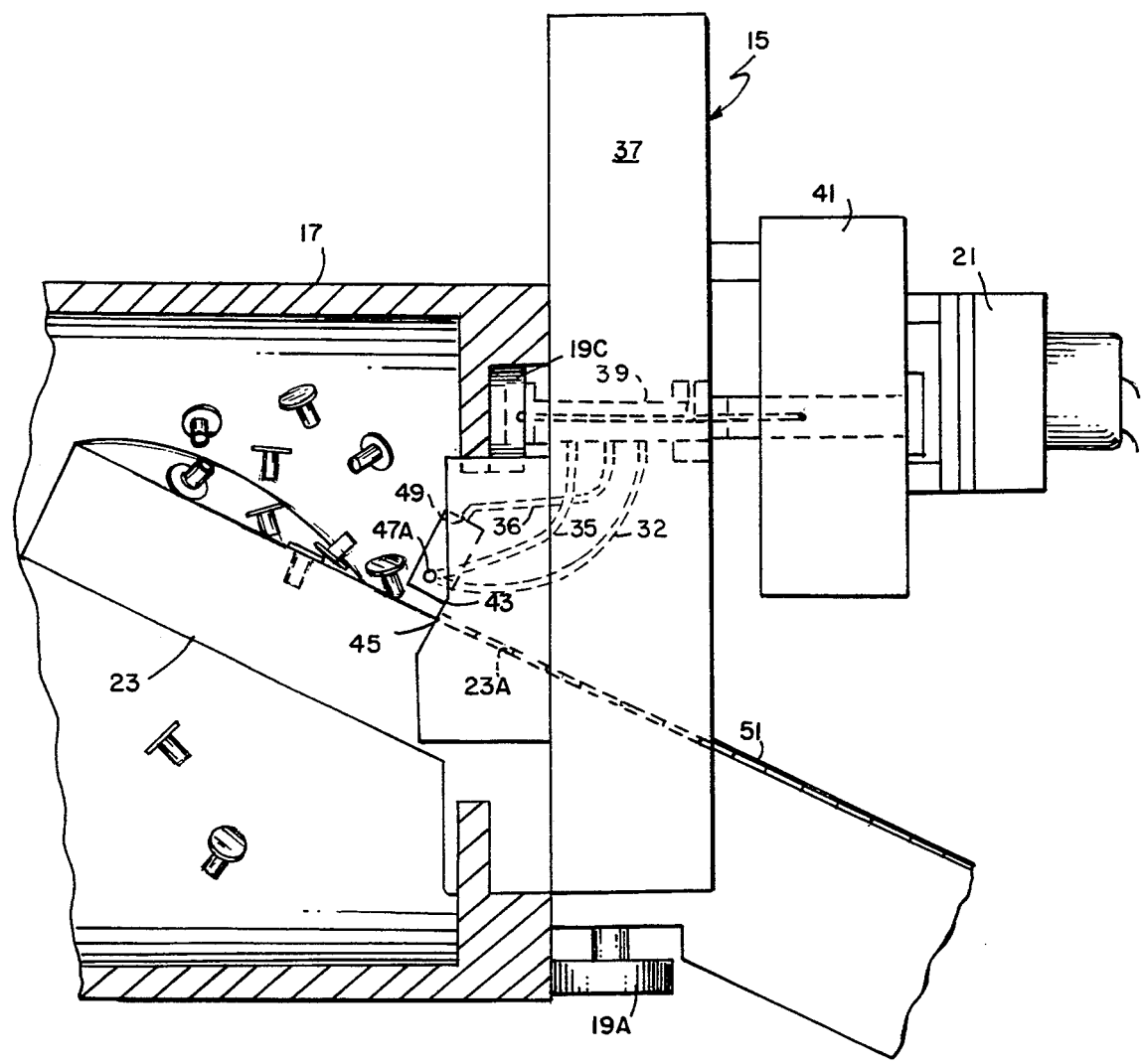
FIG. 2 is a side elevational view partially in cross-section showing the track and rivet orientation station.

Referring now to FIG. 2 the orientation station 15 includes a housing 37 which supports the barrel 17. Barrel 17 is held in alignment by orientation bearing 19A which engages a side wall of barrel 17. The barrel is rotated on its axis by drive wheel 19C that is powered by motor 21. Motor 21 is connected to drive wheel 19C by means of a hollow shaft 39. Shaft 39 extends from drive wheel 19C to motor 21 through an air distributor 41. Air distributor 41 supplies air to the inside of shaft 39. Within housing 37 the air from the inside of shaft 39 is sequentially distributed to air ports 47A, 47B and 49 to orient the rivets. Rotation of shaft 39 enables the air to be sequentially distributed between each of the ports within the fastener orientation station.

Rivets within the revolving barrel 17 randomly fall onto track 23. Some of the rivets are properly aligned with their tenons disposed between the rails of the track and with the undersides of their heads disposed upon the rails. Many others, however, fall with varying orientations. A top of a head may slide on the rail or an edge of a head may lodge between the rails with the tenon riding on the rails. Some of the rivets, however, will travel on the track in the correct alignment.

As the rivets move on the track the misaligned rivets will enter the orientation station. In the orientation station misaligned rivets will engage a stop wall 43 and aligned rivets will pass through an opening 45. Misaligned rivets will be blown off the track surface 23A by blasts of air emerging from side ports 47A and 47B (only 47A is shown in FIG. 2). The air from left side port 47A will blast beneath the head of the misaligned rivet and blow it off track 23. The ports are aligned on a plane parallel with track 23 but spaced above top of the rivet so that the jets will pass over the heads of aligned rivets but will engage the underside of misaligned rivets.

Rivets that engage the stop wall 43 also can be lapped one upon the other. Top port 49 blows down upon such misaligned rivets and forces them into alignment so that they will slide into opening 45. Opening 45 is spaced from the track surface 23A by predetermined distance that allows only aligned rivets to pass down the track. Air jets are directed from ports 47A, 49 and 47B sequentially so that they will not oppose each other as they are providing the function of removing misaligned rivets. Such sequential distribution of air through the ports is provided by the distributor 41 and the individual channels 32, 36 and 35 connecting the inside of shaft 39 to their respective ports. Correctly aligned rivets pass along the track 23 in a continuous row. A cover plate 51 is disposed over the track and the rivets to prevent them from riding out of the track.

Figure 3:
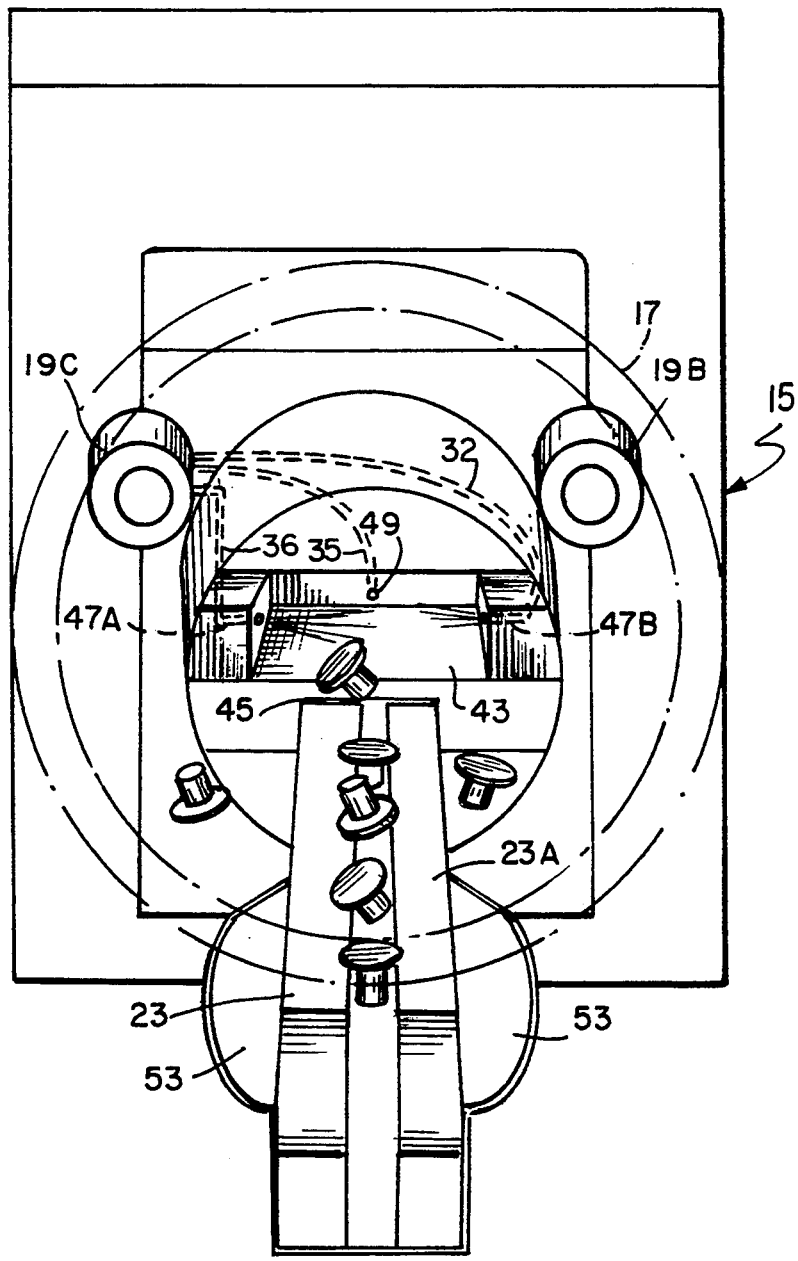
FIG. 3 is a front elevational view of the rivet orientation station.

Referring now to FIG. 3 the rivets are shown as they are aligned or misaligned between the tracks 23. As the rivets slide down the track 23 they will individually encounter stop wall 43. Track 23 passes through the opening 45 in the orientation station 15. Rivets that are properly aligned, that is with the undersides of the heads resting upon the track surface 23A and the tenons falling between the tracks 23 will pass through the opening 45. The opening 45 is of a predetermined height which allows only aligned rivets to pass through it. Those rivets which are not aligned will encounter the sequential blasts of air from the ports arranged around the track 23. Side ports 47A and 47B are directed toward each other and are spaced above opening 45 sufficiently that the blasts will engage the head of the misaligned rivet and blow it off but will simply blow over the heads of aligned rivets. Top port 49 is arranged directly over the space between tracks 23. A blast of air from port 49 will engage the top of a misaligned rivet and will also engage the top of a rivet immediately behind it. From time to time the head of one rivet will slip over (or under) the head of the next adjacent rivet and overlap it. The overlapping of heads prevents the first rivet from passing through the opening 45. The sequential blast of air from the top port 49 will force the overlapped rivet into alignment and enable the rivets to pass through the opening 45. Sequential blowing of air jets from the ports prevents the jets from cancelling each other out in their respective activities. The duration of the blast of air can be between 0.1 and 1.0 seconds at a pressure between about 20 and 125 pounds per square inch (psi). Enhanced catching of rivets on the tracks 23 is provided by flanges 53 which extend from each of the surfaces.

Figure 4:
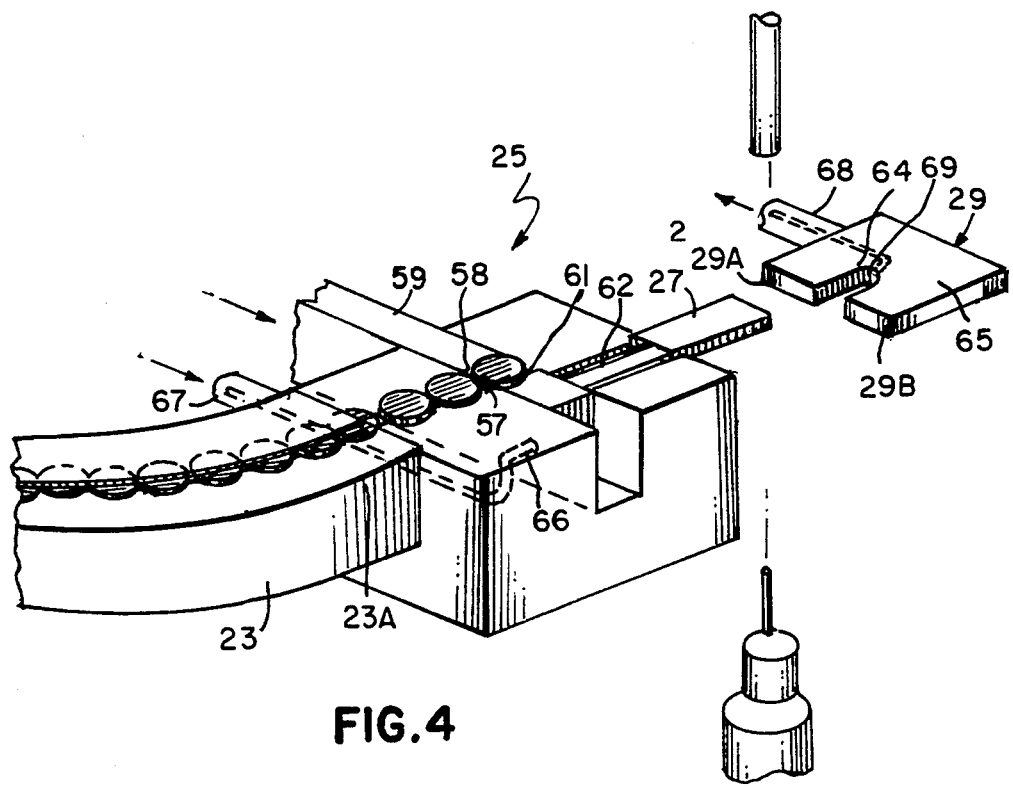
FIG. 4 is a perspective view of the segregation station in which the rivet is in place in a shuttle while the shuttle is in its entry position.
Figure 5:
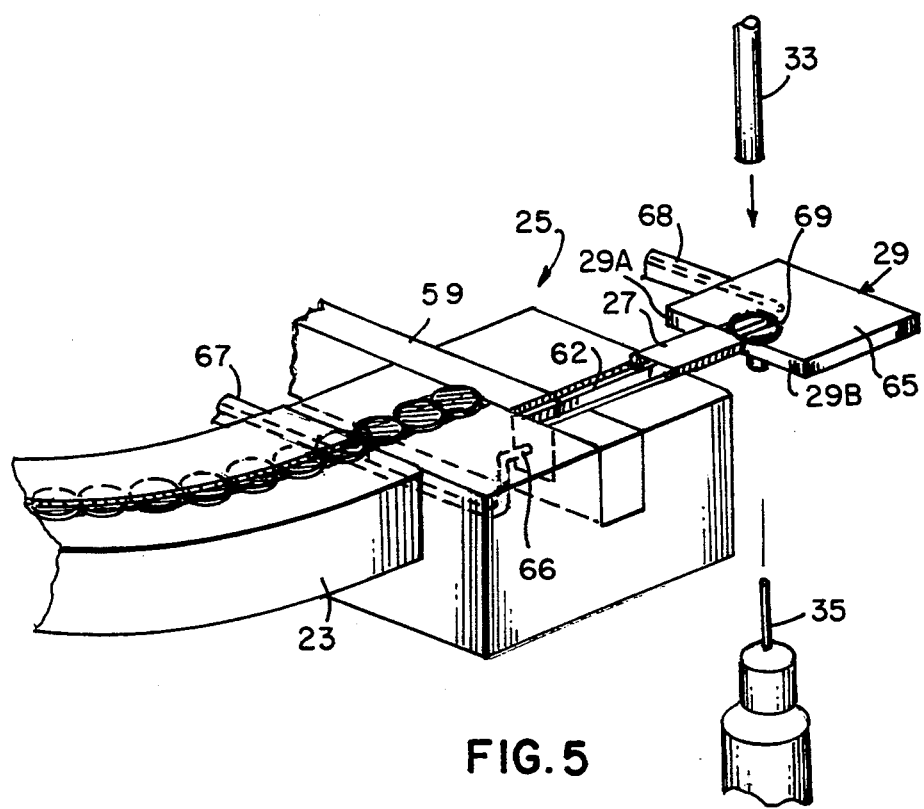
FIG. 5 is a view of the same segregation station in which the shuttle has been moved to its exit position.

Referring now to FIG. 4 the segregation station 25 is shown with the station cover 55 removed. The segregation station 25 is disposed at the end of the track 23. Properly aligned rivets with the undersides of their heads disposed on track surface 23A enter segregation station 25. Rivets sliding down the track 23 force the first rivet in the row to enter the segregation station. The tenons of the rivets move into an entry slot within the segregation station and pass into a shuttle slot 58 in shuttle 59. The first rivet in the row engages a stop wall 61. Shuttle 59 is only slightly wider than the tenon of a rivet so that shuttle slot 58 can hold only one rivet. Shuttle 59 moves to a second position as Shown in FIG. 5. Shuttle 59 can be moved by any appropriate means such as an air piston (not shown). The entry slot 57, the shuttle slot 58 and the shuttle 59 form the gate which transfers the rivets one at a time to a receiver.

An exit slot 62 is also disposed in the segregation station. Exit slot 62 extends from the shuttle slot 58 in its offload position to the edge of the segregation station. The exit chute 27 extends from the exit slot 62. The exit chute 27 is formed of a C-shaped member where the two legs of the "C" receive the underside of the head of a fastener. In this way the fastener can be easily moved correctly oriented from the segregation station to a receiver 29.

Receiver 29 is a fork-shaped member with crenel 64 disposed between a pair of tines 29A and 29B. The underside of the head of a rivet rests upon the tines 29A and 29B and the crenel 64. Movement of the rivet from the shuttle slot 58 to the receiver 29 is accomplished by a simultaneous blast of air from an air port 66 (disposed at the mouth of exit slot 62 and supplied by conduit 67) and caught by vacuum from a port 69 in the crenel 64 supplied by a conduit 68. Conduit 68 is a hollow tube adapted to support the receiver 29 and also draw the vacuum through the port 69. When in position between the tines 29A and 29B a rivet is aligned and held in place between punch 33 and pin 35.

Figure 6:
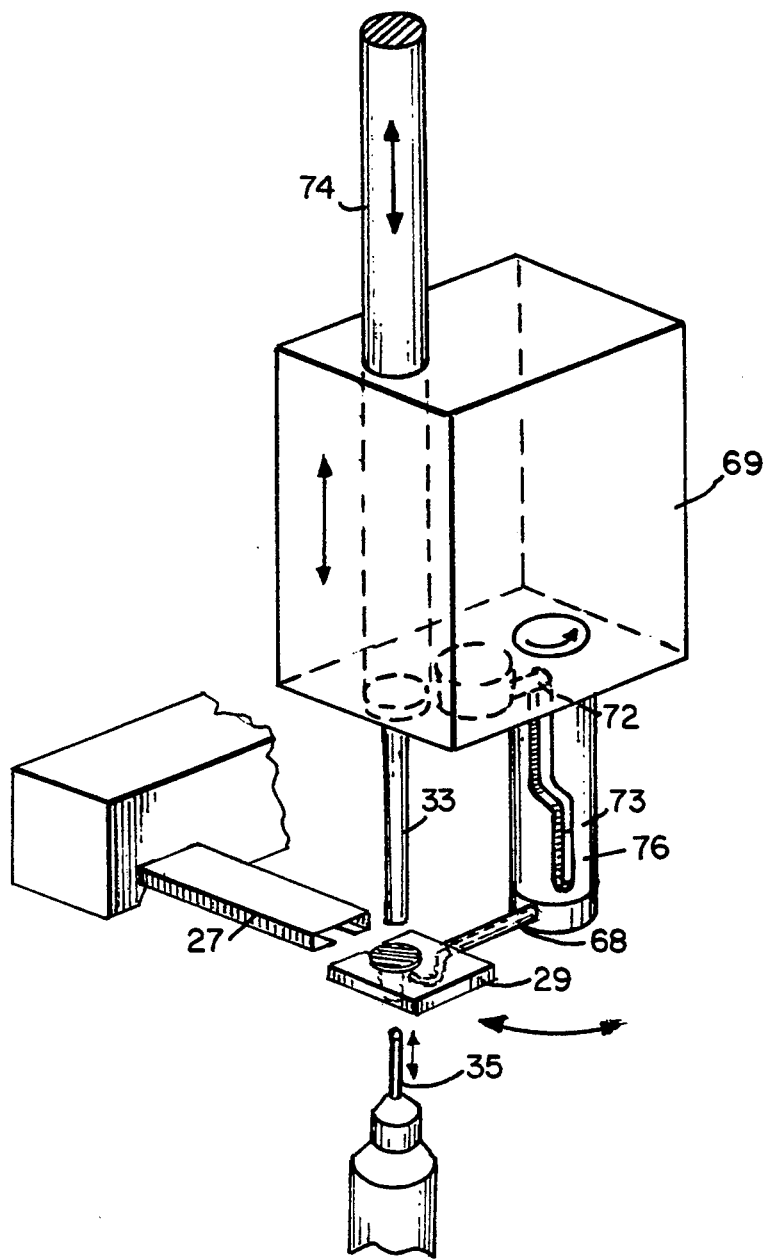
FIG. 6 is a perspective view of the rivet receiver and the insertion tool.

Referring now to FIG. 6 the relative positions of the punch 33 and the pin 35 are shown when a rivet emerges from the exit chute 27 and lands in the receiver 29. Receiver 29 is spaced from the end of exit chute 27 by a predetermined distance so that it is free to travel over the gap between the exit chute and the receiver without binding. In operation, punch 33 moves downwardly with piston rod 74. Piston rod 74 carries with it block 69 having a rider 72 that fits within a follower 73 so that as block 69 travels downwardly, rider 72 moves within follower 73. Post 76 is free to rotate within block 69. As it rotates due to the action of the cam it carries with it receiver 29. Receiver 29 is cammed to swing away from punch 33 just as the tip of the tenon of the rivet engages the pin 35 thereby enabling the rivet to stand between punch 33 and pin 35 without the need of lateral support from the receiver 29. The movement prevents damage to the receiver from the downward movement of the punch.

It is apparent that changes and modifications can be made within the spirit and scope of the present invention, but it is my intention, however, only to be limited by the scope of the appended claims.

As my invention I claim:

1. A device for delivery of fasteners having heads with tenons disposed beneath said heads to an insertion tool, said device comprising:

track means having a proximal end and a distal end and comprising two spaced-apart rails each having a fastener receiving surface to receive undersides of the heads of the fasteners falling thereon, said track means disposed in a downwardly inclined slope between its distal and proximal ends whereby fasteners on said track means slide from the proximal end towards the distal end;

means for placing fasteners randomly onto said track means whereby some of the fasteners are correctly aligned with the tenons between the rails and undersides of heads on the rails and some are misaligned;

fastener orienting means disposed adjacent the proximal end of said track means, said fastener orienting means including a plurality of fluid injector ports disposed around said track means, two of said ports facing each other and a third port disposed over said track means; and means to direct a fluid through said ports sequentially so that misaligned fasteners on said track means are forced into alignment or removed from said track means thereby leaving only properly aligned fasteners to proceed on said slope towards said distal end.

2. The device according to claim 1 wherein said means for placing fasteners includes a barrel having an open end, said barrel being adapted to hold a supply of fasteners; and means to revolve said barrel about its axis whereby fasteners in said barrel tumble onto the proximal end of said track means.

3. The device according to claim 1 further including a flange disposed on the side of each of said rails at the proximal end thereof to enhance catching of fasteners onto said rails.

4. The device according to claim 1 wherein the fastener orienting means includes a housing and a fluid delivery means to deliver fluid to each of said ports sequentially.

5. The device according to claim 4 wherein said housing has a face with an opening therein and a stop wall surrounding said opening, said track means and said fasteners passing through said opening, said stop wall being spaced from said fastener receiving surface by a predetermined distance whereby only aligned fasteners can pass through said opening on said track and misaligned fasteners are stopped.

6. A device for delivery of fasteners having heads with tenons disposed beneath said heads to an insertion tool, said device comprising:

track means having a proximal end and a distal end and comprising two spaced-apart rails each having a fastener receiving surface to receive undersides of heads of the fasteners falling thereon, said track means disposed in a downwardly inclined slope between its distal and proximal ends whereby fasteners on said track means slide from the proximal end towards the distal end;

means for placing fasteners randomly onto said track means whereby some of the fasteners are correctly aligned with tenons between rails and undersides of the heads being on the rails and some are misaligned;

fastener orienting means disposed adjacent the proximal end of said track means, said fastener orienting means including a plurality of fluid injector ports disposed in a housing around said track means, two of said ports facing each other and a third port disposed over said track means, said housing having a face with an opening therein and a stop wall surrounding said opening, said track means and said fasteners passing through said opening, said stop wall being spaced from said fastener receiving surface by a predetermined distance whereby aligned fasteners can pass through said opening on said track and misaligned fasteners are stopped and fall off; and means to direct a fluid through said ports sequentially so that misaligned fasteners on said track means are forced into alignment or removed from said track means thereby leaving only properly aligned fasteners to proceed on said slope towards said distal end.

7. A device for transferring fasteners to an insertion tool, said device comprising:

segregation means including a pair of spaced apart surfaces adapted to receive undersides of heads of the fasteners, said segregation means having a proximal and a distal end, the proximal end of said segregation means being arranged to receive a supply of fasteners arriving in a continuous aligned row from a source and the distal end being arranged to deliver a single fastener, said segregation means further including a gate means disposed between the proximal and distal ends of said segregation means, said gate means including: an entry means, a means to stop a first in line of the fasteners being carried on said surfaces and a shuttle means to move the first in line fastener through the segregation means;

exit means at the distal end of said segregation means to transfer the first in line fastener from the segregation means to a receiver, said receiver being disposed to receive said fastener from said exit means and to hold it in an operative relationship relative to said insertion tool;

means to withdraw the fastener from the exit means including: a fluid jet port in said segregation means and a vacuum port in said receiver and means to operate said ports simultaneously by drawing a vacuum in said vacuum port and forcing fluid through said fluid jet port to move the fastener to said receiver.

8. The device according to claim 7 wherein the shuttle means includes a slide reciprocally disposed in said segregation means to carry the fastener from the stop means to said exit means.

9. The device according to claim 7 wherein the receiver is pivotally mounted and arranged to swing away from said insertion tool as said tool moves towards said receiver to avoid said tool engaging said receiver.

10. The device according to claim 7 wherein said exit means includes a chute extending from the distal end of said segregation means to adjacent said receiver.

11. A device for delivery of fasteners having heads with tenons disposed beneath said heads to an insertion tool, said device comprising:

track means having a proximal end and a distal end and comprising two spaced-apart rails each having a fastener receiving surface to receive undersides of heads of the fasteners falling thereon, said track means disposed in a downwardly inclined slope between its distal and proximal ends whereby fasteners on said track means slide from the proximal end towards the distal end;

means for placing fasteners randomly onto said track means whereby some of the fasteners are correctly aligned with tenons between the rails and undersides of the heads resting on the rails and some are misaligned;

fastener orienting means disposed adjacent the proximal end of said track means, said fastener orienting means including a plurality of fluid injector ports disposed around said track means, two of said ports facing each other and a third port disposed over said track means;

means to direct a fluid through said ports sequentially so that misaligned fasteners on said track means are forced into alignment or removed from said track means thereby leaving only properly aligned fasteners to proceed on said slope towards said distal end;

segregation means including a pair of spaced apart surfaces adapted to receive the undersides of the heads of the fasteners, said segregation means having a proximal and a distal end, the proximal end of said segregation means being arranged to receive a supply of fasteners arriving in a continuous aligned row from the distal end of said track means and the distal end of said segregation means being arranged to deliver a single fastener to said insertion tool, said segregation means further including a gate means disposed between the proximal and distal ends of said segregation means, said gate means including an entry means, a means to stop a first in line of the fasteners being carried on said surfaces and a shuttle means to move the fastener through the segregation means;

exit means at the distal end of said segregation means to transfer the first in line fastener from the segregation means to a receiver, said receiver being disposed to receive said fastener from said exit means and to hold it in an operative relationship relative to said insertion tool; and means to withdraw said fastener from said exit means and transfer it to said receiver.

12. The device according to claim 11 wherein said means for placing fasteners includes a barrel having one open end, said barrel being adapted to hold a supply of fasteners; and means to revolve said barrel about its axis whereby fasteners in said barrel tumble onto the proximal end of said track means.

13. The device according to claim 12 further including a flange disposed on the side of each of said rails at the proximal end thereof to facilitate catching of fasteners tumbling in said barrel.

14. The device according to claim 11 wherein the fastener orienting means includes a housing and a fluid delivery means to deliver fluid to each of said ports sequentially.

15. The device according to claim 14 wherein said housing has a face with an opening therein and a stop wall surrounding said opening, said track means and said fasteners passing through said opening, said stop wall being spaced from said fastener receiving surface by a predetermined distance whereby aligned fasteners can pass through said opening on said track and misaligned fasteners are stopped.

16. The device according to claim 11 wherein the means to withdraw the fastener from the exit means includes a fluid jet port in said segregation means and a vacuum port in said receiver and means to operate said ports simultaneously to move the fastener.

17. The device according to claim 11 wherein the shuttle means includes a slide reciprocally disposed in said segregation means to carry the fastener from the stop means to said exit means.

18. The device according to claim 11 wherein the receiver is pivotally mounted and arranged to swing away from said insertion tool as said tool moves towards said receiver to avoid said tool engaging said receiver.

* * * * *